United States Patent
Voelker

(10) Patent No.: US 7,336,217 B2
(45) Date of Patent: Feb. 26, 2008

(54) METHOD AND APPARATUS FOR INTERFEROMETRIC RADAR MEASUREMENT

(75) Inventor: Michael Voelker, Immenstaad (DE)

(73) Assignee: Eads Astrium GmbH, Munich (DE)

( * ) Notice: Subject to any disclaimer, the term of this patent is extended or adjusted under 35 U.S.C. 154(b) by 144 days.

(21) Appl. No.: 11/229,639

(22) Filed: Sep. 20, 2005

(65) Prior Publication Data
US 2006/0164288 A1 Jul. 27, 2006

(30) Foreign Application Priority Data
Sep. 21, 2004 (DE) .................. 10 2004 046 041

(51) Int. Cl.
G01S 13/90 (2006.01)
G01S 7/40 (2006.01)
(52) U.S. Cl. .................. 342/25 C; 342/59; 342/89; 342/174
(58) Field of Classification Search ............... 342/25 C
See application file for complete search history.

(56) References Cited

U.S. PATENT DOCUMENTS

| | | | | |
|---|---|---|---|---|
| 4,602,257 | A * | 7/1986 | Grisham | 342/25 F |
| 4,975,704 | A * | 12/1990 | Gabriel et al. | 342/25 C |
| 5,332,999 | A * | 7/1994 | Prati et al. | 342/25 F |
| 5,659,318 | A * | 8/1997 | Madsen et al. | 342/25 C |
| 5,923,279 | A * | 7/1999 | Bamler et al. | 342/25 C |
| 6,046,695 | A * | 4/2000 | Poehler et al. | 342/25 A |
| 6,441,376 | B1 * | 8/2002 | Glass et al. | 250/342 |
| 6,452,181 | B1 * | 9/2002 | Glass et al. | 250/342 |
| 6,586,741 | B2 * | 7/2003 | Glass et al. | 250/342 |
| 6,861,978 | B2 * | 3/2005 | Lam | 342/351 |
| 6,864,828 | B1 * | 3/2005 | Golubiewski et al. | 342/25 C |
| 7,209,072 | B2 * | 4/2007 | Braubach et al. | 342/59 |
| 2002/0050942 | A1 * | 5/2002 | Grisham | 342/25 |
| 2004/0145514 | A1 * | 7/2004 | Raney | 342/120 |

(Continued)

FOREIGN PATENT DOCUMENTS

DE 102 56 420 A1 6/2004

(Continued)

OTHER PUBLICATIONS

Massonnet. ERS-1 Internal Clock Drift Measured by Interferometry. Mar. 1995. IEEE Transactions on Geoscience and Remote Sensing. vol. 33, No. 2. pp. 401-408.*

(Continued)

*Primary Examiner*—Thomas H. Tarcza
*Assistant Examiner*—Shelley Chen
(74) *Attorney, Agent, or Firm*—Crowell & Moring LLP

(57) ABSTRACT

In a method for interferometric radar measurement, at least two side looking RADAR systems on satellite and/or missile-supported platforms illuminate a common surface area by means of microwave signals. A first side looking RADAR system sends a first radar signal on a first transmit frequency, and at least a second side looking RADAR system sends at least a second radar signal on at least a second transmit frequency. At least one of the at least two side looking RADAR systems receives the at least two interfering radar signals reflected on the common surface area, determines difference phases of the received radar signals from the interferograms, determines therefrom a drift of a system clock of the at least two side looking RADAR systems, and compensates the determined drift.

16 Claims, 2 Drawing Sheets

U.S. PATENT DOCUMENTS

2006/0164288 A1* 7/2006 Voelker .................. 342/25 A
2007/0090990 A1* 4/2007 Nelson .................. 342/25 R

FOREIGN PATENT DOCUMENTS

| EP | 1 065 518 A2 | 1/2001 |
| EP | 1 426 785 A | 6/2004 |
| EP | 1426785 A2 * | 6/2004 |

OTHER PUBLICATIONS

Eineder M. Ed—Institute of Electrical and Electronics Engineers; "Ocillator clock drift compensation in bistatic interferometric SAR" IGARSS 2003, IEEE 2003 International Geoscheince and Remote Sensing Symposium. Proceedings. Toulouse, France, Jul. 21-25, 2003; IEEE International Geoscience and Remote Sensing Symposium, NY, NY; IEEE, US, Bd. vol. 7 of 7, pp. 1449-1451.

Martin-Neira M. et al: "Study of a constellation of bistatic radar altimeters for mesoscale Ocean Applications" IEEE Transactions on Geoscience and Remote Sensing, IEEE Inc. New York, US (Bd. 36. No. 6, Nov. 1998, pp. 1898-1904.

Michael Eineder, "Ocillator Clock Drift Compensation in Bistatic Interferometric SAR", (2003).

* cited by examiner

METHOD AND APPARATUS FOR INTERFEROMETRIC RADAR MEASUREMENT

CROSS REFERENCE TO RELATED APPLICATION

This application claims the priority of German patent document 10 2004 046 041.8, filed Sep. 21, 2004, the disclosure of which is expressly incorporated by reference herein.

FIELD OF THE INVENTION

The present invention relates to a method and apparatus for interferometric radar measurement.

BACKGROUND

In synthetic aperture radar (SAR) systems, a highly precise time reference is of considerable importance for exact measuring results. If several SAR systems are used, for example, on different satellites, a mutual balancing of the individual time references of the SAR systems is also important for a precise radar measurement.

European Patent Document EP 1 065 518 discloses a radar system which has a number of SAR systems on satellite- or missile-supported platforms. In order to avoid drift of the internal oscillators of the SAR systems, which are used as a time reference, a microwave or laser connection between the individual SAR systems is used to transmit an oscillator frequency from a main oscillator to the other oscillators, and thereby to synchronize these oscillators.

The essay "Oscillator Clock Drift Compensation in Bistatic Interferometric SAR", M. Eineder, IGARSS 2003, Toulouse, *IEEE Proceedings of IGARSS'03*, describes the compensation of the drift of time references in SAR systems. The transmitters and receivers of the radar signal are spatially separated, and the oscillator frequency is exchanged between the receiving satellites via an inter-satellite connection in order to achieve a synchronization of the time references.

Drift compensation in such systems requires additional inter-satellite connections for transmission of the oscillator frequency. Moreover, additional measuring-relevant parameters cannot be determined by this method, and other compensation methods require additional components for implementing control mechanisms. However, the use of these control mechanisms requires time which is lost during the actual radar measurement. The scanning for the referencing thus remains limited to a few hertz.

SUMMARY OF THE INVENTION

It is an object of the present invention to provide a method and apparatus for interferometric radar measurement, which permits drift compensation during radar measurements by means of SAR interferometry, without the use of high-expenditure inter-satellite connections.

This object is achieved by means of the method and apparatus for interferometric radar measurement according to the invention, in which, when several SAR systems are used, at least one of the SAR systems receives the radar signals sent by at least one of the other SAR systems and reflected on the ground. Interferograms created by the overlapping of the various spectral ranges of the received radar signals can be used to determine a drift of the system clocks of the SAR systems which can be taken into account, particularly compensated, during further processing of the radar signals. This permits drift compensation, without the use of an inter-satellite connection.

More specifically, the invention relates to a method for interferometric radar measurement by means of at least two synthetic aperture radar (SAR) systems on satellite or missile-supported platforms, which systems illuminate a common surface area by means of microwave signals. For this purpose, a first SAR system sends a first radar signal on a first transmit frequency, and a second SAR system sends at least a second radar signal on at least a second transmit frequency. In this case, at least one of the at least two SAR systems receives the at least two interfering radar signals reflected on the common surface area, determines difference phases of the received radar signals from the interferograms, determines a drift of a system clock of the at least two SAR systems from the difference phases, and compensates the determined drift. An additional connection between the platforms is therefore no longer necessary for synchronizing the systems clocks.

In a preferred embodiment of the method, the first and the at least a second SAR system receives the at least two interfering radar signals of the at least two SAR systems reflected on the common surface area, determines difference phases of the received radar signals from the interferograms, determines a drift of a system clock of the at least two SAR systems from the difference phases, and compensates the determined drift, preferably by means of corresponding measures for the drift compensation.

In particular, the process can derive a first interferogram from the first radar signal received by the first SAR system and from at least a second radar signal received by the at least a second SAR system. In comparison to further interferograms, this interferogram has a base length which is twice as effective.

In addition, the process can derive a second interferogram from the first radar signal received by the first SAR system and from the first radar signal received by the at least a second SAR system. This interferogram derived in the range of the first transmit frequency contains a difference phase which is a result of a phase error of the second SAR system minus a phase error of the first SAR system.

Furthermore, the process can derive a third interferogram from the at least a second radar signal received by the first SAR system and the at least a second radar signal received by the at least a second SAR system. This interferogram derived in the range of the second transmit frequency contains a difference phase, which also is a result of a phase error of the second SAR system minus a phase error of the first SAR system.

In order to determine a system difference phase (which is a result of a phase system error of the first SAR system minus a phase error of the second SAR system), the process can derive a fourth interferogram from the first radar signal received by the first SAR system and at least a second radar signal. This interferogram, which is crossed in the microwave frequency range, is created by the overlapping of the ground spectral ranges of the first and second radar signal because of a displacement of the ground spectrum of the received radar signals.

The process can also derive a fifth interferogram from the first radar signal received by the at least a second SAR system and the at least a second radar signal, in order to determine a difference phase which is equal to the determined difference phase in the case of the fourth interferogram. This interferogram is also created by an overlapping of the ground spectral ranges of the first and second radar signal.

The invention also relates to a system for interferometric radar measurement having at least two synthetic aperture radar (SAR) systems on satellite- and/or missile-supported platforms, which illuminate a common surface area by means of microwave signals. A first SAR system can send a first radar signal on a first transmit frequency and at least a second SAR system can send at least a second radar signal on at least a second transmit frequency. In this case, at least one of the at least two SAR systems is constructed for receiving the at least two interfering radar signals reflected on the common surface area, for determining difference phases of the received radar signals from the interferograms, for determining a drift of a system clock of the at least two SAR systems from the difference phases, and for compensating the determined drift.

In a preferred embodiment, the first and the at least a second SAR system are constructed for receiving the at least two interfering radar signals of the at least two SAR systems, which are reflected on the common surface area, for determining difference phases of the received radar signals from the interferograms, for determining a drift of a system clock of the at least two SAR systems from the difference phases, and compensating the determined drift. The system preferably contains devices for the drift compensation which are activated as a function of the determined drift.

In particular, the first SAR system has a steeper incidence angle with respect to the illuminated surface area than that of the at least a second SAR system.

In this case, the first transmit frequency should be higher than the at least a second transmit frequency. In order to obtain an overlapping region in the ground spectra a transversely to the flight direction of the satellites, a higher transmit frequency is assigned to the SAR system with the steeper incidence angle than to the SAR system with the flatter incidence angle.

Furthermore, the system can be constructed such that the first and the at least a second SAR system send radar signals on more than one transmit frequency. The different and partially mutually supplementing information content of the radar image data, which are recorded in different frequency ranges, yields an improvement of the interpretation of these radar image data.

In addition, the system can be constructed such that the first and the at least a second SAR system send radar signals with more than one polarization. As with the use of several frequencies, the use of different polarizations permits a higher yield of information when the radar images are interpreted.

In particular, the first and the at least a second radar signal can be either frequency-modulated continuous signals or frequency-modulated pulses. When frequency-modulated pulses are used, for example, data concerning the distance or the scattering of the radar signal (which, in turn, provides information on the surface condition) can be obtained from the transit time of the pulse, the slope of its edges and the energy of the pulse response.

The system can also be constructed for sending the first and the at least a second radar signal in a time-staggered manner within a pulse interval. Since the volume of the radar image data is very high, staggering the radar signals can increase the image size at reduced resolution, and hence reduce the data transmission rate.

In the description, in the claims, in the abstract and in the drawings, the terms used in the attached list of reference symbols and the assigned reference symbols are used.

Other objects, advantages and novel features of the present invention will become apparent from the following detailed description of the invention when considered in conjunction with the accompanying drawings.

DETAILED DESCRIPTION OF THE DRAWINGS

In the following, the same and/or functionally identical elements may be provided with the same reference numbers.

Figure 1:
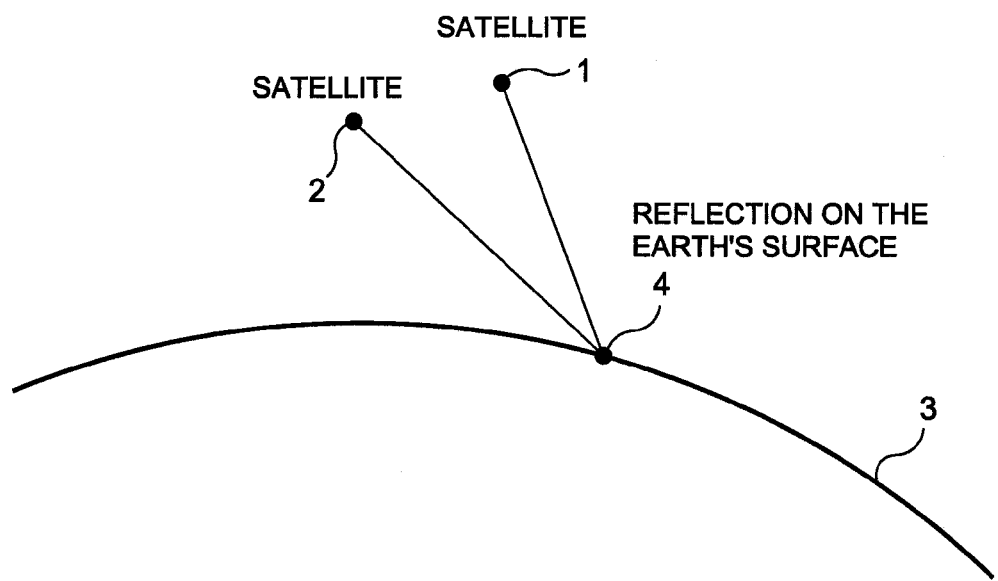
FIG. 1 is a view of an embodiment of the system according to the invention having two SAR systems on a satellite-supported platform.

FIG. 1 shows an embodiment of the system according to the invention with two SAR systems 1 and 2, each on a satellite-supported platform. Both SAR systems 1 and 2 illuminate a surface area 4 of the earth's surface 3, with the first satellite and the first SAR system 1 situated over the illuminated surface area 4 at a steeper incidence angle than the second satellite and the second SAR system 2. The first SAR system 1 sends with a first transmit frequency range around $f_1$, while the second SAR system 2 sends with a second transmit frequency range around $f_2$ which is lower than the first transmit frequency $f_1$. (In order to obtain an overlapping region in the ground spectrum transversely to the flight direction of the satellites, a higher transmit frequency is assigned to the SAR system with the steeper incidence angle than to the SAR system with the flatter incidence angle.)

The reflected radar signals of the first and second SAR systems are in each case received by both SAR systems. The sent radar signals may be frequency-modulated pulses as well as frequency-modulated continuous signals. When frequency-modulated pulses are used, among others, data concerning the distance or the scattering of the radar signal (which in turn provides information on the surface condition) can be obtained (for example, from the transit time of the pulse, the slope of its edges and the energy of the pulse response).

In addition, it becomes possible for the first and second SAR system 1 and 2 to send radar signals on, in each case, more than one transmit frequency. Incident radar signals are reflected differently by the surface depending on the frequency. Different frequency bands exhibit different backscatter characteristics as a function of the surface condition. The intensity of the backscattered signal is high dependent on, among other things, the surface inclination or the incidence angle of the radar signal.

The different and partially mutually supplementary information content of the radar image data which are recorded in different frequency ranges, leads to an improvement of the interpretation of these radar image data. Likewise, the use of different polarizations permits a higher yield of information when interpreting the radar images.

Since the volume of the radar image data is very high, time-staggered transmission of the radar signals within one pulse interval can be used to increase the image size at reduced resolution, and hence reduce the data transmission rate.

Figure 2:
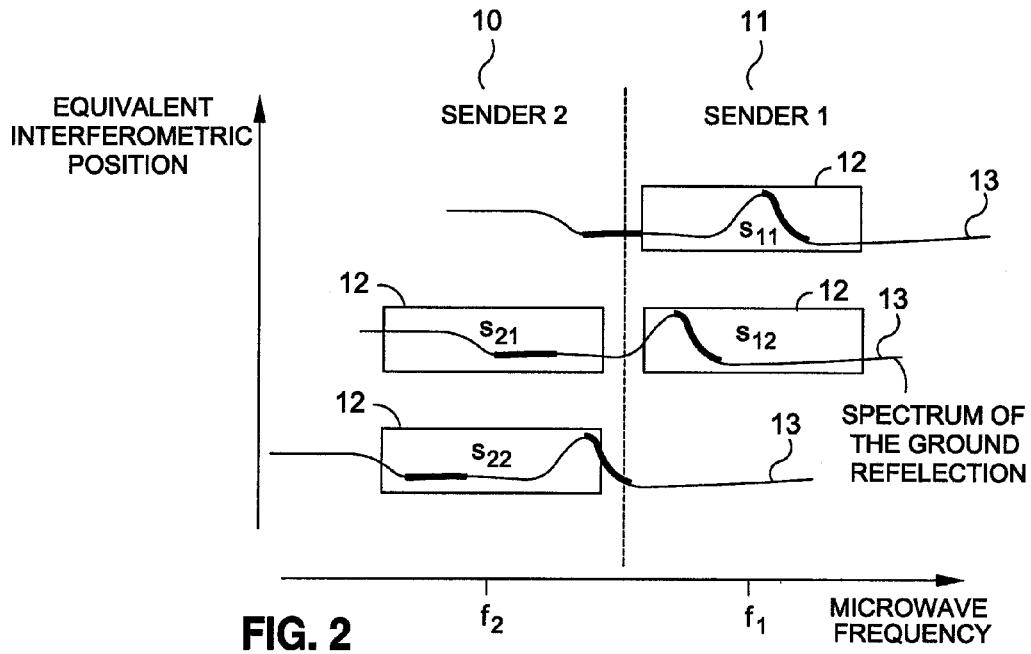
FIG. 2 is a spectral diagram of the received radar signals in the microwave frequency range with a view of their position along a geometrical base line.

FIG. 2 is a spectral diagram of the received radar signals in the microwave frequency range illustrating their position along a geometrical base line. Here, $s_{11}$ indicates a radar signal sent and received by the first SAR system; $s_{12}$ indicates a radar signal sent by the first SAR system and received by the second SAR system. Analogously, $s_{21}$ is a radar signal sent by the second SAR system and received by the first SAR system; and $s_{22}$ is a radar signal sent and received by the second SAR system. Furthermore, $\delta_1$ is defined as the phase error in the sent signal of the first SAR system based on a drift of the system clocks; $-\delta_1$ is to be the phase error in the received signal of the first SAR system. Analogously, $\delta_2$ is the phase error of the sent signal of the second SAR system based on a drift of the system clocks; $-\delta_2$ is the phase error in the received signal of the second SAR system.

Thus, the received signals contain the following phase errors:

| | |
|---|---|
| $s_{11}, s_{11}^*, s_{22}$ and $s_{22}^*$ | 0 |
| $s_{12}$ and $s_{21}^*$ | $\delta_1-\delta_2$ |
| $s_{21}$ and $s_{12}^*$ | $\delta_2-\delta_1$ |

The spectral diagram shows the spectral distributions of the different radar signals 13 reflected on the surface. The first SAR system receives the signals $s_{11}$ and $s_{21}$ with a signal bandwidth 12 in the frequency range 11 and 10, respectively. Analogously thereto, the second SAR system receives the signals $s_{12}$ and $s_{22}$ with the signal bandwidth 12 in the frequency range 11 and 10, respectively.

Figure 3:
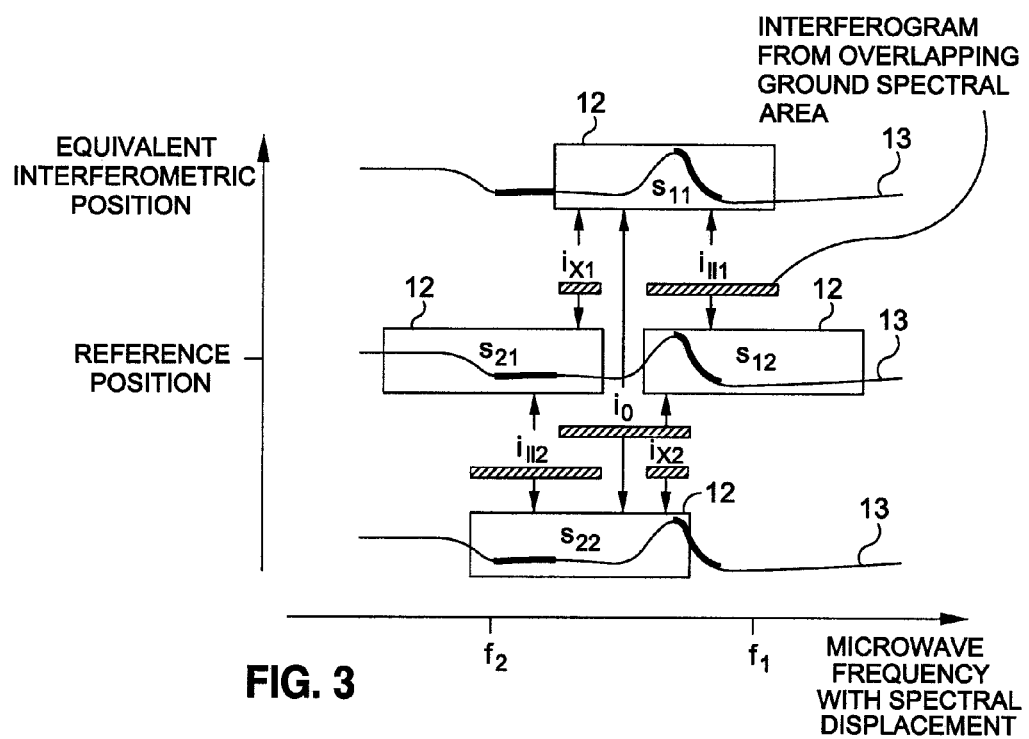
FIG. 3 is a spectral diagram of the received radar signals with their position displacement due to reflection on the illuminated surface area, and the resulting overlapping spectral ranges of the surface information for forming the interferograms.

As illustrated in FIG. 3, five interferograms can be formed from the four received radar signals $s_{11}, s_{12}, s_{21}$ and $s_{22}$. The interferograms are formed as the product of a first of the four received radar signals $s_{11}^*, s_{12}, s_{21}$ and $s_{22}$ with another complexly conjugated radar signal of the four received radar signals $s_{11}^*, s_{12}^*, s_{21}^*$ and $s_{22}^*$.

The interferograms derived around $f_1$ and $f_2$ (always the same transmitter)

$$i_{\|1}=s_{11}s_{12}^* \text{ and}$$

$$i_{\|2}=s_{21}s_{22}^*$$

each contain the same differential phase error $\delta_2-\delta_1$, which is based on a drift between the systems. This measurement corresponds to a doubling of a single bistatic SAR system in which the transmitter and receiver are separate, without any drift compensation but with a multiplied signal intensity.

The displacement of the ground spectrum of the reflected radar signals results in an overlapping of the ground spectral ranges which permits a formation of interferograms $i_{x1}$ and $i_{x2}$ within these overlapping ranges, which interferograms are crossed in the microwave range. In this case, the radar signals around $f_1$ interfere coherently with radar signals around $f_2$ in:

| | |
|---|---|
| $i_0 = s_{11} s_{22}^*$ | with an effective base length doubled with respect to the other interferograms, and |
| $i_{x1} = s_{11} s_{21}^*$ | and |
| $i_{x2} = s_{12} s_{22}^*$ | with the same differential phase errors $\delta_2-\delta_1$ which, however, compared with $i|_1$ and $i|_2$, have an opposite preceding sign. |

These interferograms are used for the measurement and compensation of the differential phase error. The signal fractions pertaining to the geometry, such as altitude information during topographical measurements are extracted from the differences between these interferograms. The following phase errors therefore remain:

| | |
|---|---|
| $i|_1 i_{x2}^*; i|_2 i_{x1}^*$ | $2(\delta_2-\delta_1)$ |
| $i|_1 i|_2 i_0^*$ | $2(\delta_2-\delta_1)$ |

It is sufficient for at least one of the crossed interferograms $i_{x1}$ or $i_{x2}$ to be present in a reduced slant range resolution (in a small spectral width) because the determination of the differential phase error of a low order is independent of the slant range (for example, constant within a pulse or a modulation period). For example, if the differential phase drifts between SAR systems are to be compensated, the determined differential phase errors can be determined by averaging the interferograms in the slant range direction for different positions in the flight direction. In the case of phase errors which vary rapidly with time, either the synthetic aperture has to be shortened correspondingly, or the occurring displacement of the image data along the flight direction must be detected, on the basis of the different phases of the SAR pictures situated above one another geometrically, but not with respect to time. At pulse rates in the range of 5 kHz, phase drift measurements of a rate of up to 500 Hz are expected.

The displacement of the ground spectrum on the basis of the interferometric measuring arrangement permits the computation of an interferogram between the two microwave frequency ranges also in the case of an arrangement in which only one receiver is used. However, a phase error compensation as in the case of a multireceiver arrangement is not possible here. Thus, for example, when the first SAR system is used as a receiver, a crossed interferogram $$i_{x1}=s_{11}s_{21}^*$$

can be determined. This method of operation can also be implemented in combination with the multireceiver variant, in which case the time reception windows of the participating receivers are situated in a displaced manner with respect to one another, for example, with a small overlap in order to be able to detect expanded surface widths or in order to have to detect lower data quantities.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

REFERENCE SYMBOLS

1 First SAR system on a first satellite
2 second SAR system on a second satellite
3 earth's surface 4 illuminated surface area
$f_1$ first transmit center frequency of the first SAR system
$f_2$ second transmit center frequency of the second SAR system
10 transmit range of the first SAR system
11 transmit range of the second SAR system
12 bandwidth of the received radar signals
13 spectrum of the radar signals reflected on the illuminated surface
$s_{11}$ radar signal sent and received by the first SAR system
$s_{12}$ radar signal sent by the first SAR system and received by the second SAR system
$s_{21}$ radar signal sent by the second SAR system and received by the first SAR system
$s_{22}$ radar signal sent and received by the second SAR system
$\delta_1$ the phase error of the first SAR system based on a drift of the system clocks
$\delta_2$ the phase error of the second SAR system based on a drift of the system clocks
$i_0$ first interferogram from the overlapping spectral ranges of the radar signals $s_{11}$ and $s_{22}$
$i_{i1}$ second interferogram from the overlapping spectral ranges of radar signals $s_{11}$ and $s_{12}$
$i_{i2}$ third interferogram from the overlapping spectral ranges of the radar signals $s_{21}$ and $s_{22}$
$i_{x1}$ fourth interferogram from the overlapping spectral ranges of the radar signals $s_{11}$ and $s_{21}$
$i_{x2}$ fifth interferogram from the overlapping spectral ranges of the radar signals $s_{12}$ and $s_{22}$.

What is claimed is:

1. A method for interferometric radar measurement in which at least two side looking RADAR systems, mounted on satellite and/or missile-supported platforms, wherein illuminate a common surface area by means of microwave signals; wherein:
a first side looking RADAR system sends a first radar signal in a range around a first transmit side looking RADAR frequency;
a second side looking RADAR system sends at least a second radar signal on at least a second transmit frequency; and
at least one of the first and second side looking RADAR systems receives at least two interfering radar signals reflected on the common surface area, and based thereon determines difference phases of the received radar signals by forming at least three interferograms, determines a drift of a system clock of the at least two SAR systems from the difference phases, and compensates the determined drift.

2. The method according to claim 1, wherein each of the first and second side looking RADAR system receives the at least two interfering radar signals reflected on the common surface area, and based thereon determines difference phases of the received radar signals from the at least three interferograms, determines a drift of a system clock of the first and second side looking RADAR systems from the difference phases, and compensates the determined drift.

3. The method according to claim 2, wherein a first interferogram is derived from a radar signal $s_{11}$ sent and received by the first side looking RADAR system, and from a radar signal $s_{22}$ sent and received by the second side looking RADAR system.

4. The method according to claim 3, wherein a second interferogram is derived from the radar signal $s_{11}$, and a radar signal $s_{12}$ sent by the first side looking RADAR system and received by the second side looking RADAR system.

5. The method according to claim 4, wherein a third interferogram is derived from a radar signal S21 sent by the second side looking RADAR system and received by the first side looking RADAR system and a radar signal sent $s_{22}$ and received by the second side looking RADAR system.

6. The method according to claim 5, wherein a fourth interferogram is derived from the radar signal $s_{11}$, and the radar signal $s_{21}$.

7. The method according to claim 6, wherein a fifth interferogram is derived from the radar signal $s_{12}$ and the radar signal $s_{22}$.

8. A system for the interferometric radar measurement having at least two side looking RADAR systems on satellite- and/or missile-supported platforms which illuminate a common surface area by means of microwave signals, including a first side looking RADAR system which can send a first radar signal around a first transmit center frequency, and a second side looking RADAR system which can send at least a second radar signal around at least a second transmit center frequency; wherein:
at least one of the first and second side looking RADAR systems is constructed for receiving at least two interfering radar signals reflected on the common surface area, for determining, based on said interfering radar signals, difference phases of the received radar signals by forming at least three interferograms.

9. The system according to claim 8, wherein the first and the second side looking RADAR system are constructed for receiving the at least two interfering radar signals reflected on the common surface area, of the at least two side looking RADAR systems, for determining, based on said interfering radar signals, difference phases of the received radar signals from the at least three interferograms, determining a drift of a system clock of the at least two side looking RADAR systems from the difference phases, and compensating the determined drift.

10. The system according to claim 9, wherein the first side looking RADAR system has a steeper incidence angle with respect to the illuminated surface areas than the second side looking RADAR system.

11. The system according to claim 10, wherein the first transmit center frequency is higher than the second transmit center frequency.

12. The system according to claim 11, wherein both the first and the second side looking RADAR system send radar signals on more than one transmit frequency.

13. The system according to claim 12, wherein the first and the second side looking RADAR system send radar signals with more than one polarization.

14. The system according to claim 12, wherein the first and the second radar signals are frequency-modulated continuous signals.

15. The system according to claim 12, wherein the first and the second radar signals are frequency-modulated pulses.

16. The system according to claim 15, wherein the first and the second radar signals are sent within a time-staggered pulse interval.

* * * * *